Dec. 3, 1935. W. E. DELANO 2,022,759
ABRADING TOOL
Filed March 28, 1935
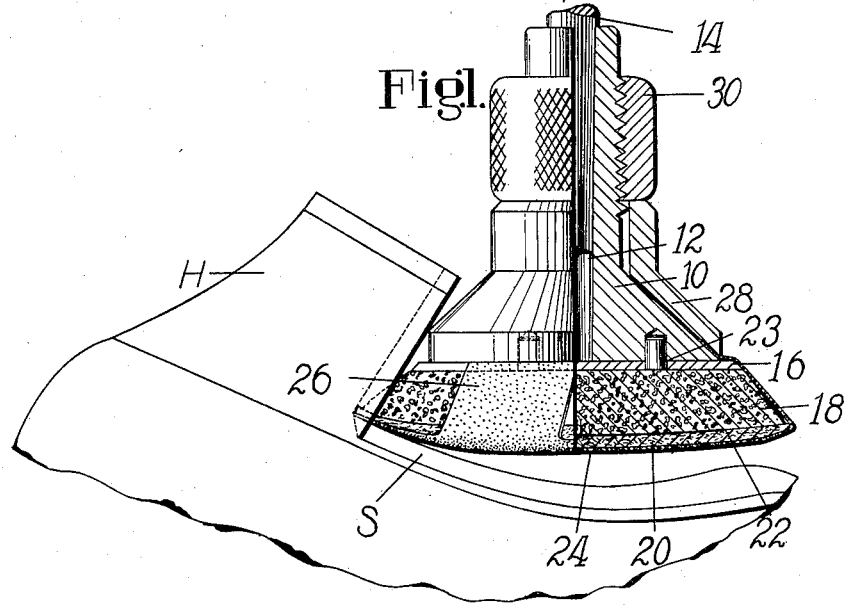
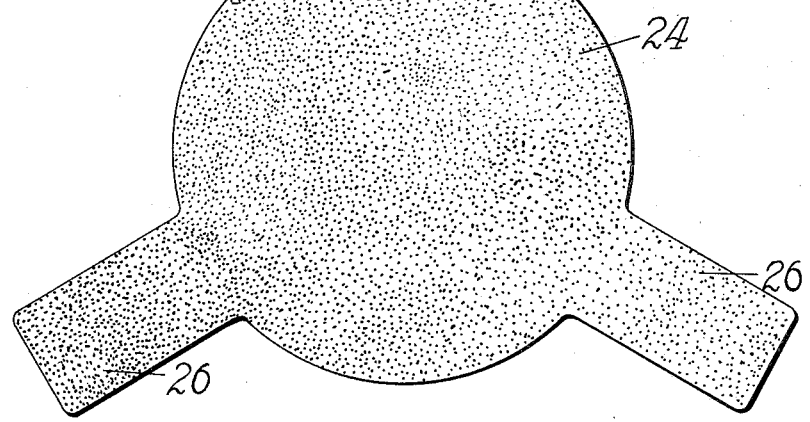
INVENTOR
Walter E. Delano
By his Attorney
Harlow M. Davis Patented Dec. 3, 1935

2,022,759

UNITED STATES PATENT OFFICE 2,022,759

ABRADING TOOL

Walter E. Delano, Brockton, Mass., assignor to United Shoe Machinery Corporation, Paterson, N. J., a corporation of New Jersey Application March 28, 1935, Serial No. 13,502

6 Claims. (Cl. 51—197)

This invention relates to abrading tools and is herein illustrated as embodied in a rotary disk type of tool adapted for buffing the shank portions of shoes.

It is an object of the present invention to provide an improved buffing tool of the type above referred to. In accordance with a feature of the invention the illustrated buffing tool is provided with a composite pad comprising a disk of leather, a disk of rubber secured to the leather disk, and a disk of felt secured to the rubber disk for supporting an abrasive cover. In the illustrated construction the felt disk extends beyond the periphery of the rubber disk, and is cemented to the rubber disk at a locality which is spaced from the periphery of the rubber disk, leaving the felt disk unattached to the marginal portion of the rubber disk. The omission of cement at the marginal portion of the rubber disk makes for greater flexibility of the felt by avoiding the stiffness which would result from the presence of the cement. In the illustrated construction the rubber disk is relatively thick and frusto-conical in form, which further provides for greater flexibility at the marginal portion and avoids interference with the heel breast surface when the tool is in operation upon portions of the shank close to the heel breast line, and the abrasive element consists of a disk of emery cloth having tabs extending from its margin, which tabs are turned up over the periphery of the pad and clamped against the tool body.

Still other objects and features of the invention are set forth in the accompanying specification and claims, reference being had to the accompanying drawing, in which, Fig. 1 is an elevational view, partly in section, showing the improved tool in operation upon the shank of the shoe; and Fig. 2 is a plan view of an abrasive element used upon the tool shown in Fig. 1.

The improved tool is provided with a body portion 10 having a central opening 12 shaped to engage a tapered end of a driven spindle 14. Carried by the tool body 10 is a composite pad for cushioning an abrasive element. This pad consists of a disk of leather 16, a disk of sponge rubber 18, and a disk of felt 20. The rubber disk 18 is frusto-conical in form and is relatively thick as compared with the leather disk 16 and the felt disk 20. The leather disk 16 is adhesively attached to the smaller face of the rubber disk 18, while the felt disk 20 is adhesively attached to the larger face of the rubber disk 18, a suitable rubber cement being employed to effect such attachment. The felt disk 20 has a diameter which is slightly greater than the diameter of the larger face of the rubber disk 18 so that the felt disk extends beyond the margin of the rubber disk. The cement which secures the felt disk to the rubber disk covers the central area of the rubber disk but does not extend outwardly to the periphery of the rubber disk, the circumference of the cemented area being indicated in Fig. 1 by the reference character 22. The felt disk is thus left free and unattached to the marginal area of the rubber disk outside of the circumference 22.

The composite pad above described is secured to the tool body 10 by cementing the leather disk 16 directly to the tool body. Extending from the tool body are three projections 23 consisting of pins the inner ends of which are secured in recesses in the tool body 10 and the outer ends of which are received within corresponding recesses in the leather disk. These projections insure proper centering of the composite pad in attaching it to the tool body and they serve also to transmit the drive of the tool body into the pad.

An abrasive element 24 consisting of emery cloth covers a working face of the felt disk 20. The abrasive cover 24 is provided with three marginal tabs 26 which are turned up over the periphery of the composite pad and which are clamped against a frusto-conical surface of the tool body 10 by a clamping ring 28 having a flange the inner surface of which is complemental to the frusto-conical surface of the tool body element. The abrasive cover may, if desired, be of a type commonly used on inflatable pads. Such covers are molded to fit the pad and are provided with a large number of marginal tabs. Clamping pressure for the ring 28 is obtained by a knurled nut 30 threaded upon the tool body and in abutting engagement with the ring 28.

Fig. 1 shows the improved tool in operation upon the shank portion S of the shoe having a heel H. By reason of the fact that the felt disk 20 extends beyond the periphery of the margin of the rubber disk 18 the abrasive cover 24 is enabled to reach as far as the heel breast line of the shoe. The frusto-conical form of the rubber disk 18 avoids interference with the heel breasting surface and at the same time renders the marginal portion of the pad more flexible. The flexibility of the marginal portion of the pad is increased by omitting cement between the felt disk and the rubber disk at the locality of the bevel 22. The composite pad may readily be removed by hand from the tool body by breaking the adhesive bond between the leather disk 16 and the tool body.

Having thus described my invention, what I claim as new and desire to secure by Letters Patent of the United States is:

1. A pad for use in abrading tools of the rotary disk type, comprising a disk of leather, a disk of rubber secured to said leather disk, and a disk of felt secured to said rubber disk for supporting an abrasive cover.

2. A pad for use in abrading tools of the rotary disk type, comprising a disk of rubber, a reinforcing disk of leather secured to one face of said rubber disk, and a disk of felt for supporting an abrasive cover, said felt disk being secured to said rubber disk at a locality spaced from the periphery of said rubber disk, leaving the felt disk unattached to the marginal portion of the rubber disk, and the felt disk having a diameter which is greater than the diameter of said rubber disk.

3. A pad for use in abrading tools of the rotary disk type, comprising a relatively thick frusto-conical disk of rubber, a relatively thin reinforcing disk of leather secured to the smaller face of said rubber disk, and a relatively thin disk of felt for supporting an abrasive cover, said felt disk having a diameter which is greater than the diameter of the larger face of said rubber disk, and being adhesively secured to the larger face of said rubber disk over an area which is spaced from the periphery of the larger face of said rubber disk, leaving a considerable portion of the margin of said felt disk unattached to said rubber disk.

4. An abrading tool of the rotary disk type, comprising a rotary tool body, a disk of leather supported by said tool body, a disk of rubber adhesively secured to said leather disk, a disk of felt adhesively secured to said rubber disk, an abrasive cover for said felt disk, and means for securing said abrasive cover to said tool body.

5. An abrading tool of the rotary disk type, comprising a rotary tool body, a disk of leather secured to said tool body, a disk of rubber secured to said leather disk, a disk of felt secured to said rubber disk at a locality spaced from the periphery of said rubber disk, leaving the felt disk unattached to the marginal portion of the rubber disk, an abrasive cover for said felt disk, said abrasive cover having a plurality of marginal tabs, and a clamp for securing the tabs of said abrasive cover to said tool body.

6. An abrading tool of the rotary disk type, comprising a rotary tool body, a relatively thin disk of leather supported by said tool body, a relatively thick disk of rubber adhesively secured to said leather disk, a relatively thin disk of felt secured to said rubber disk and having its peripheral portion extending beyond the periphery of said rubber disk, an abrasive cover for said felt disk, and means for securing said abrasive cover to said tool body.

WALTER E. DELANO.